(12) United States Patent
Kitada

(10) Patent No.: US 9,887,641 B2
(45) Date of Patent: Feb. 6, 2018

(54) POWER CONVERTER

(71) Applicant: Murata Manufacturing Co., Ltd., Kyoto-fu (JP)

(72) Inventor: Hiroshi Kitada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 15/467,565

(22) Filed: Mar. 23, 2017

(65) Prior Publication Data
US 2017/0288575 A1    Oct. 5, 2017

(30) Foreign Application Priority Data
Apr. 1, 2016    (JP) .................. 2016-074140

(51) Int. Cl.
    *H02M 1/12*      (2006.01)
    *H02M 7/5387*    (2007.01)
    *H02M 7/00*      (2006.01)

(52) U.S. Cl.
    CPC ........... *H02M 7/5387* (2013.01); *H02M 1/12* (2013.01); *H02M 7/003* (2013.01)

(58) Field of Classification Search
    CPC .......... H02M 1/12; H02M 7/00; H02M 7/003; H02M 7/515; H02M 7/521; H02M 7/5387; H02M 2007/217; H02M 2007/219; H02M 2007/5387
    See application file for complete search history.

(56) References Cited

U.S. PATENT DOCUMENTS

| | | | | |
|---|---|---|---|---|
| 4,849,950 A * | 7/1989 | Sugiura | .................. | H02M 1/12 363/36 |
| 5,241,217 A * | 8/1993 | Severinsky | ............. | H02J 9/065 307/64 |
| 6,906,933 B2 * | 6/2005 | Taimela | .................... | H02J 3/32 363/34 |

(Continued)

FOREIGN PATENT DOCUMENTS

| | | |
|---|---|---|
| DE | 102013100246 A1 | 7/2014 |
| EP | 2827481 A2 | 1/2015 |

(Continued)

OTHER PUBLICATIONS

The extended European search report issued by the European Patent Office dated Sep. 11, 2017, which rresponds to European Patent Application No. 17159260.3-1808 and is related to U.S. Appl. No. 15/467,565.

*Primary Examiner* — Matthew Nguyen
(74) *Attorney, Agent, or Firm* — Studebaker & Brackett PC

(57) ABSTRACT

A power converter includes: a plurality of external terminals; a grounded earth terminal; a power conversion circuit; a ground conductor; and a plurality of inductors. A plurality of nodes of the power conversion circuit are connected to the respective plurality of external terminals. The power conversion circuit performs power conversion by switching received power. A plurality of inductors are inserted between the plurality of external terminals and the plurality of nodes. Further, another inductor is inserted between the ground conductor and the earth terminal. In this way, there can be provided a power converter that provides a sufficient noise reduction effect also in a high frequency region.

5 Claims, 9 Drawing Sheets

(56) References Cited

U.S. PATENT DOCUMENTS

| | | | |
|---|---|---|---|
| 2014/0211522 A1* | 7/2014 | Tang | .................. H02M 7/48 363/41 |
| 2015/0021983 A1 | 1/2015 | Karimi et al. | |
| 2015/0222170 A1 | 8/2015 | Berger et al. | |

FOREIGN PATENT DOCUMENTS

| | | |
|---|---|---|
| JP | 2011-147238 A | 7/2011 |
| JP | 2013-162628 A | 8/2013 |
| WO | 2014/056668 A2 | 4/2014 |

\* cited by examiner

POWER CONVERTER

CROSS REFERENCE TO RELATED APPLICATIONS

This application claims benefit of priority to Japanese Patent Application 2016-074140 filed Apr. 1, 2016, the entire content of which is incorporated herein by reference.

TECHNICAL FIELD

The present disclosure relates to a power converter.

BACKGROUND

A power converter (system interconnection inverter) is used to convert DC power, generated in a photovoltaic power system or the like, into AC power and supply it to a power system. This power converter includes: a boosting converter configured to boost a DC voltage; and an inverter configured to convert the direct current into alternating current. Upon switching of a switching element of the boosting converter, the inverter, or the like, common mode voltage (neutral point potential) is fluctuated.

A single-phase inverter has an H bridge configuration employing a switching element, and is subjected to 3-level PWM control, for example. Due to this control, common mode voltage is fluctuated. The fluctuation of the common mode voltage causes leakage current flowing to a ground (earth) and high-frequency noise. The high-frequency noise is reduced by inserting a common mode choke coil between a pair of output terminals of a DC power supply and a pair of input terminals of a boosting circuit (see Japanese Patent Laying-Open No. 2011-147238).

Upon of switching of the switching element of the boosting converter or the inverter, ringing occurs. A conventional common mode choke coil can reduce noise in a low frequency region such as a switching frequency. However, according to various experiments conducted by the inventor of the present application, it was found that the noise reduction effect is low in a high frequency region such as a ringing frequency and a frequency of a harmonic wave thereof.

SUMMARY

The present disclosure has an object to provide a power converter that provides a sufficient noise reduction effect also in a high frequency region.

A power converter according to a first aspect of the present disclosure includes:
a plurality of external terminals;
an earth terminal connected to a ground;
a power conversion circuit including a plurality of nodes, each of the plurality of nodes being connected to a corresponding one of the plurality of external terminals, the power conversion circuit being configured to perform power conversion by switching received power;
a ground conductor;
a plurality of inductors, each of the plurality of inductors being inserted between a corresponding one of the plurality of external terminals and a corresponding one of the plurality of nodes; and
another inductor inserted between the ground conductor and the earth terminal.

By connecting the inductors to not only the external terminals but also the earth terminal, a noise reduction effect in a high frequency region can be increased.

In addition to the configuration of the power converter according to the first aspect, the power converter according to a second aspect of the present disclosure further includes a plurality of capacitors each including a first electrode and a second electrode, the first electrode being connected to a corresponding one of the plurality of nodes, the second electrode being connected to the ground conductor.

Common mode noise appearing in the plurality of nodes flows to the ground conductor via the capacitors.

In the power converter according to a third aspect of the present disclosure, in the configuration of the power converter according to the first or second aspect,
the plurality of inductors each inserted between the corresponding one of the plurality of external terminals and the corresponding one of the plurality of nodes are inductively coupled with the other inductor inserted between the ground conductor and the earth terminal to construct a common mode choke coil having not less than three phases.

By using the common mode choke coil, the noise reduction effect can be increased.

In the power converter according to a fourth aspect of the present disclosure, in the configuration of the power converter according to the first to third aspects,
the plurality of external terminals are connected to a DC power supply, and
the power conversion circuit is configured to receive DC power from the plurality of nodes, convert the DC power into AC power and output the AC power.

The common mode noise leaking from the power converter to the DC power supply can be reduced.

In the power converter according to a fifth aspect of the present disclosure, in the configuration of the power converter according to the first to third aspects,
the plurality of external terminals are connected to a power system, and
the power conversion circuit is configured to receive DC power, convert the DC power into AC power, and output the converted AC power from the plurality of nodes to the power system.

The common mode noise leaking from the power converter to the power system can be reduced.

By connecting the inductors to not only the external terminals but also the earth terminal, a noise reduction effect in a high frequency region can be increased.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

Each of FIG. 2A

DETAILED DESCRIPTION

First Embodiment

Figure 1:
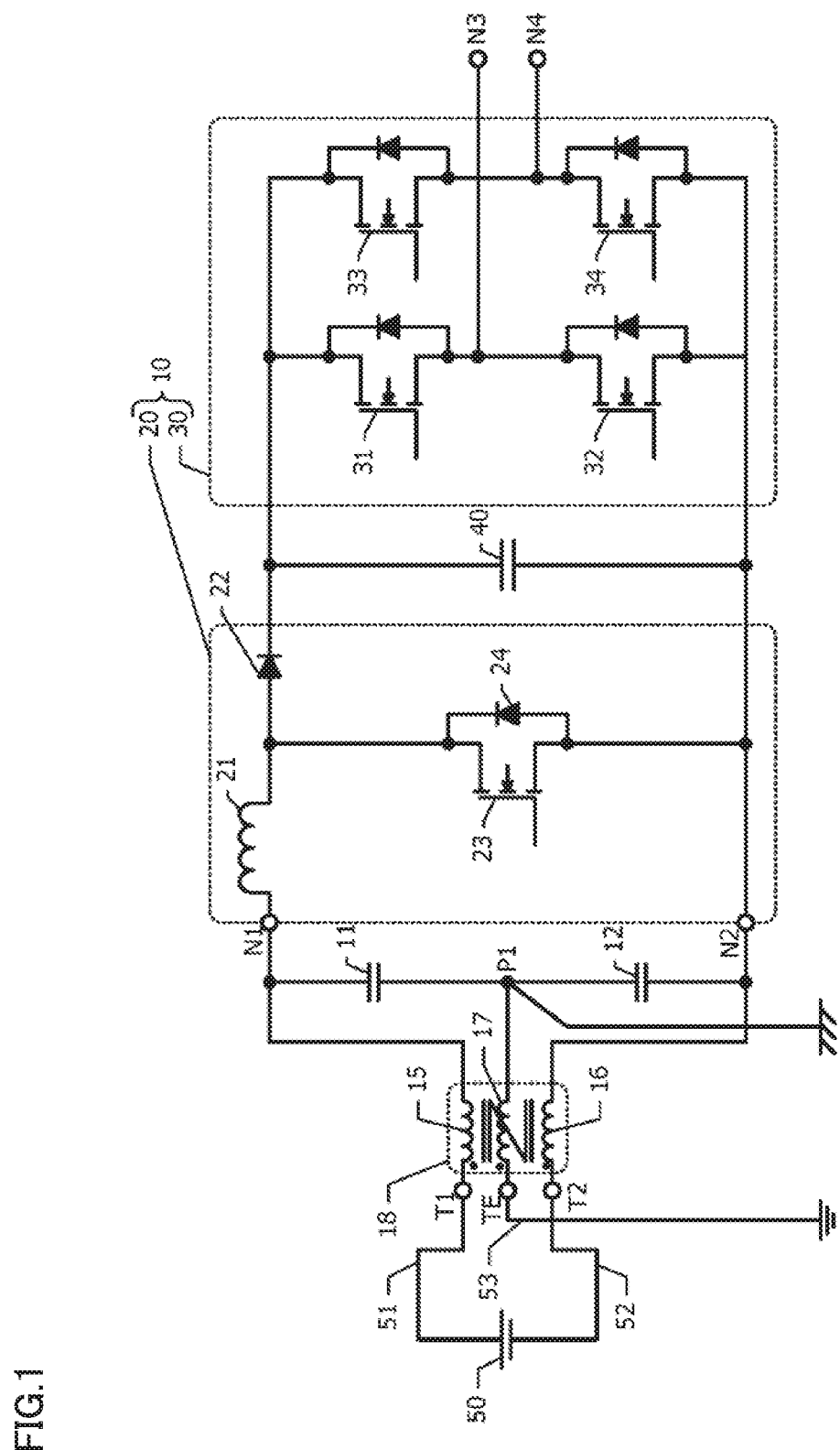
FIG. 1 is an equivalent circuit diagram of a power converter according to a first embodiment.

With reference to FIG. 1 and FIG. 2, the following describes a power converter according to a first embodiment.

FIG. 1 shows an equivalent circuit diagram of the power converter according to the first embodiment. The power converter according to the first embodiment includes external terminals T1, T2, an earth terminal TE, a common mode choke coil 18, and a power conversion circuit 10. Power conversion circuit 10 includes a boosting converter 20 and an inverter 30, and is configured to receive DC power, convert the DC power into AC power, and output the AC power.

External terminals T1 and T2 are connected to a positive electrode and a negative electrode of a DC power supply 50 via a positive line 51 and a negative line 52. Earth terminal TE is connected (grounded) to the ground via an earth line 53, and is fixed to the same potential as that of the earth. For DC power supply 50, a solar panel, a fuel cell, or the like is used, for example. External terminals T1 and T2 are connected to nodes N1 and N2 of power conversion circuit 10 via common mode choke coil 18.

One electrode (first electrode) of a capacitor 11 is connected to node N1. One electrode (first electrode) of a capacitor 12 is connected to node N2. The other electrode (second electrode) of capacitor 11 is connected to the other electrode (second electrode) of capacitor 12. A point via which the second electrode of capacitor 11 and the second electrode of capacitor 12 are connected to each other will be referred to as an interconnection point P1. Interconnection point P1 is connected to a ground conductor of power conversion circuit 10. A potential of the ground conductor serves as a reference potential (ground potential) of the power conversion circuit. Generally, a metal housing or the like is used as the ground conductor. Capacitors, such as capacitors 11, 12, connected between a signal line (power supply line) and the ground conductor is commonly referred to as "Y capacitor". In the present specification, a capacitor connected between the signal line (power supply line) and the ground conductor is referred to as "Y capacitor".

Common mode choke coil 18 includes three inductors 15, 16, 17. For a core of common mode choke coil 18, ferrite can be used, for example. Inductor 15 is inserted between external terminal T1 and node N1. Inductor 16 is inserted between external terminal T2 and node N2. Inductor 17 is connected between interconnection point P1 and earth terminal TE. Common mode choke coil 18 is connected such that magnetic fluxes generated by common mode noise current flowing from power conversion circuit 10 to external terminals T1, T2 and earth terminal TE are intensified with one another.

Boosting converter 20 includes a reactor 21, a free wheel diode 22, and a switching element 23. Diode 24 is connected to switching element 23 in parallel. An output of boosting converter 20 is sent to inverter 30. A smoothing capacitor 40 is connected to a DC line at the output side of boosting converter 20.

Inverter 30 includes four switching elements 31, 32, 33, 34 connected to configure H bridge, for example. An interconnection point between switching elements 31 and 32 serves as a node N3 for outputting single-phase AC power, and an interconnection point between switching elements 33 and 34 serves as a node N4 for outputting single-phase AC power.

For switching elements 23, 31, 32, 33, 34, power semiconductor elements are used, for example. Each of the power semiconductor elements is generally in contact with a ground conductor such as a housing in order to dissipate heat generated by an operation thereof, and the ground conductor is used as a heat sink. Therefore, due to electromagnetic coupling between each of switching elements 23, 31, 32, 33, 34 and the ground conductor, noise generated in response to a switching operation is more likely to be propagated to the ground conductor.

Figure 2A:
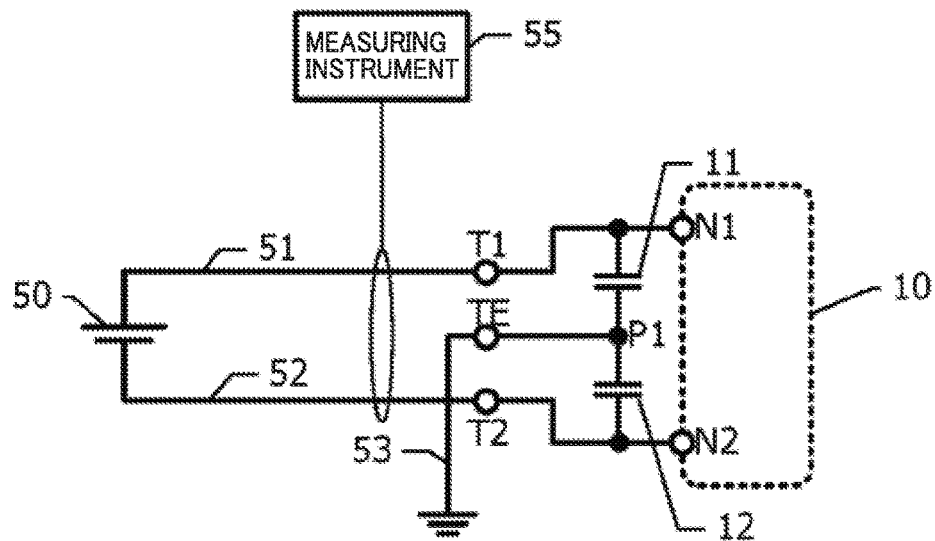
FIG. 2B is an equivalent circuit diagram showing a connection configuration among an external terminal, an earth terminal, and a power conversion circuit of a power converter used in an experiment.
Figure 2B:
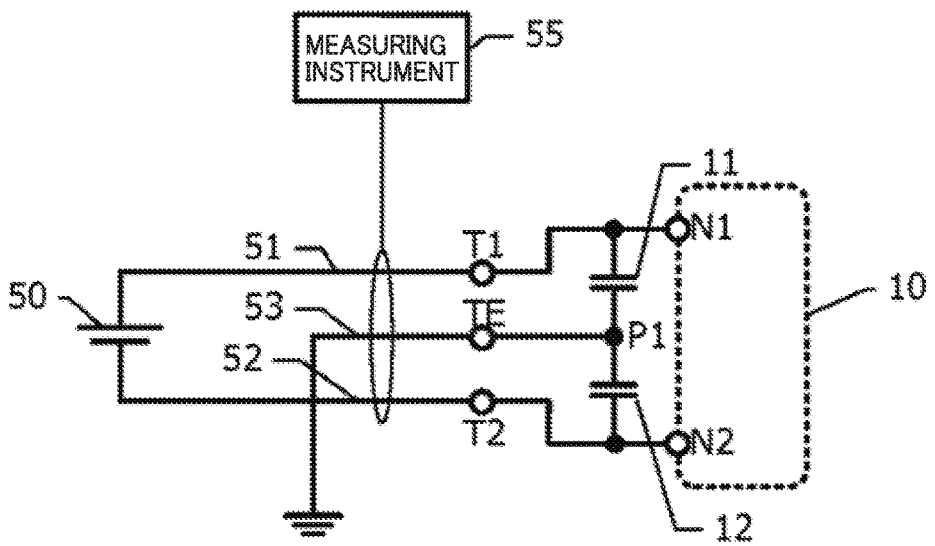

Next, with reference to FIG. 2A and FIG. 2B, in the power converter according to the first embodiment, the following describes an experiment, based on a result of which three-phase common mode choke coil 18 is employed.

Each of FIG. 2A and FIG. 2B shows a connection configuration among external terminals T1, T2, earth terminal TE, power conversion circuit 10, and DC power supply 50 in the power converter used in the experiment. Nodes N1, N2 of power conversion circuit 10 are directly connected to external terminals T1, T2, respectively. Interconnection point P1 between Y capacitors 11 and 12 is directly connected to earth terminal TE. External terminals T1 and T2 are connected to the positive electrode and negative electrode of DC power supply 50 via positive line 51 and negative line 52, respectively. Earth terminal TE is grounded by earth line 53.

By actually operating the power converter, the level of noise generated from positive line 51, negative line 52, and earth line 53 was measured using a measuring instrument 55.

Comparison is made between noise level measured with two lines, i.e., positive line 51 and negative line 52, being interposed by a probe as shown in FIG. 2A and noise level measured with three lines, i.e., positive line 51, negative line 52, and earth line 53, being interposed by a probe as shown in FIG. 2B. In a low frequency region of about 100 kHz, the noise level measured by the method of FIG. 2B is lower than the noise level measured by the method of FIG. 2A; however, in a high frequency region of not less than 1 MHz, there was found no large difference therebetween.

From the result of the experiment shown in FIG. 2A and FIG. 2B, the following knowledge is obtained.

In the low frequency region of about 100 kHz, it is considered that the noise current flowing through positive line 51 and negative line 52 and the noise current flowing through earth line 53 are opposite in phase (differential mode). On the other hand, in the high frequency region of not less than 1 MHz, it is considered that the noise current flowing through positive line 51 and negative line 52 and the noise current flowing through earth line 53 are substantially the same in phase (common mode). Therefore, by inserting a three-phase common mode choke coil in the three lines, i.e., positive line 51, negative line 52, and earth line 53, it is considered possible to reduce the common mode noise in the high frequency region of not less than 1 MHz.

Figure 3A:
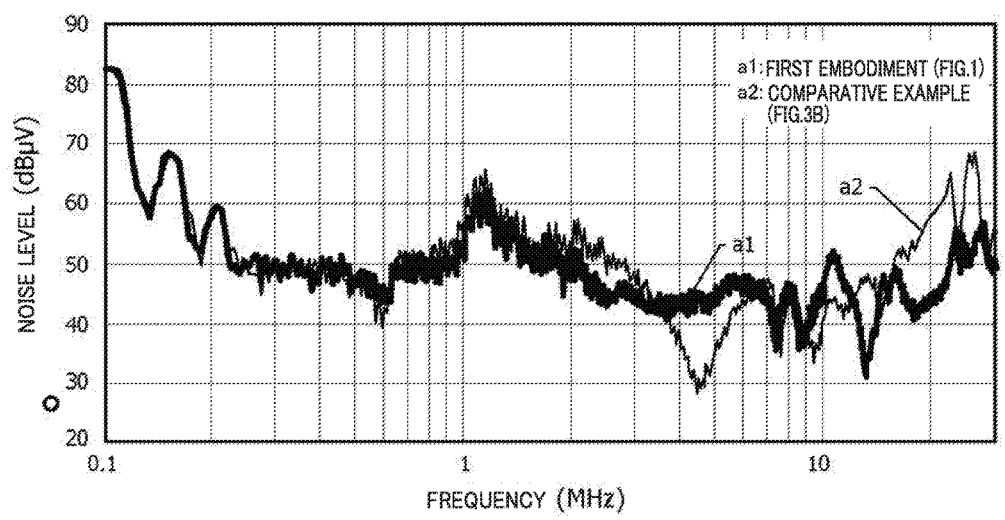
FIG. 3A is a graph showing a result of measurement of a noise level of the power converter according to each of the first embodiment and a comparative example.
Figure 3B:
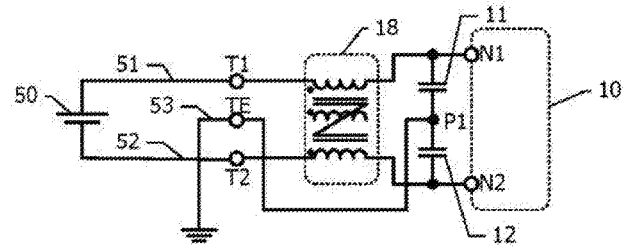
FIG. 3B is an equivalent circuit diagram of the power converter according to the comparative example.

Next, with reference to FIG. 3A and FIG. 3B, the following describes an excellent effect of the power converter according to the first embodiment. The level of noise generated from positive line 51, negative line 52, and earth line 53 was measured during an operation of the power converter according to each of the first embodiment and a comparative example.

FIG. 3B shows an equivalent circuit diagram of the power converter according to the comparative example. In the power converter according to the comparative example, interconnection point P1 of Y capacitors 11, 12 is directly connected to earth terminal TE, not via common mode choke coil 18. An inductor not used among the three inductors of common mode choke coil 18 is in an open state. The other configurations are the same as those of the power converter according to the first embodiment.

FIG. 3A shows a result of measurement of the noise levels of the power converters according to the first embodiment (FIG. 1) and the comparative example (FIG. 3B). The horizontal axis represents the frequency based on "MHz" as a unit and the vertical axis represents the noise level based on "dBμV" as a unit. A thick solid line a1 in FIG. 3A represents the level of noise leaking from external terminal T2 of the power converter according to the first embodiment into negative line 52, and a thin solid line a2 represents the level of noise leaking from external terminal T2 of the power converter according to the comparative example into negative line 52.

Around a frequency of about 1.2 MHz and 25 MHz, it is understood that noise that is based on ringing resulting from switching has occurred. By employing the configuration of the first embodiment, the noise levels at 1.2 MHz and 25 MHz are decreased as compared with the configuration of the comparative example. Particularly, the decrease of the noise level around the frequency of 25 MHz is remarkable. The decrease of the noise level is attained by inserting three-phase common mode choke coil 18 in positive line 51, negative line 52, and earth line 53.

Furthermore, in the first embodiment, an impedance from nodes N1, N2 of power conversion circuit 10 to the ground point becomes high. Accordingly, leakage current flowing to earth line 53 can be reduced. A direct current flowing through inductor 15 inserted in positive line 51 is opposite in direction to a direct current flowing through inductor 16 inserted in negative line 52. Magnetic fluxes generated by these direct currents serve to cancel each other, whereby magnetic cores of inductors 15, 16 are unlikely to be saturated.

In the embodiment shown in FIG. 1, Y capacitors 11, 12 are not necessarily provided. Y capacitors 11, 12 can be omitted. When Y capacitors 11, 12 are not provided, inductor 17 connects the ground conductor to earth terminal TE. By inserting common mode choke coil 18, the noise propagated from switching elements 23, 31, 32, 33, 34 to the ground conductor and the noise appearing in nodes N1, N2 are suppressed from leaking to positive line 51, negative line 52, and earth line 53.

Second Embodiment

Next, with reference to FIG. 4 to FIG. 6A and FIG. 6B, the following describes a power converter according to a second embodiment. A difference from the first embodiment will be described and common configurations will not be described.

Figure 4:
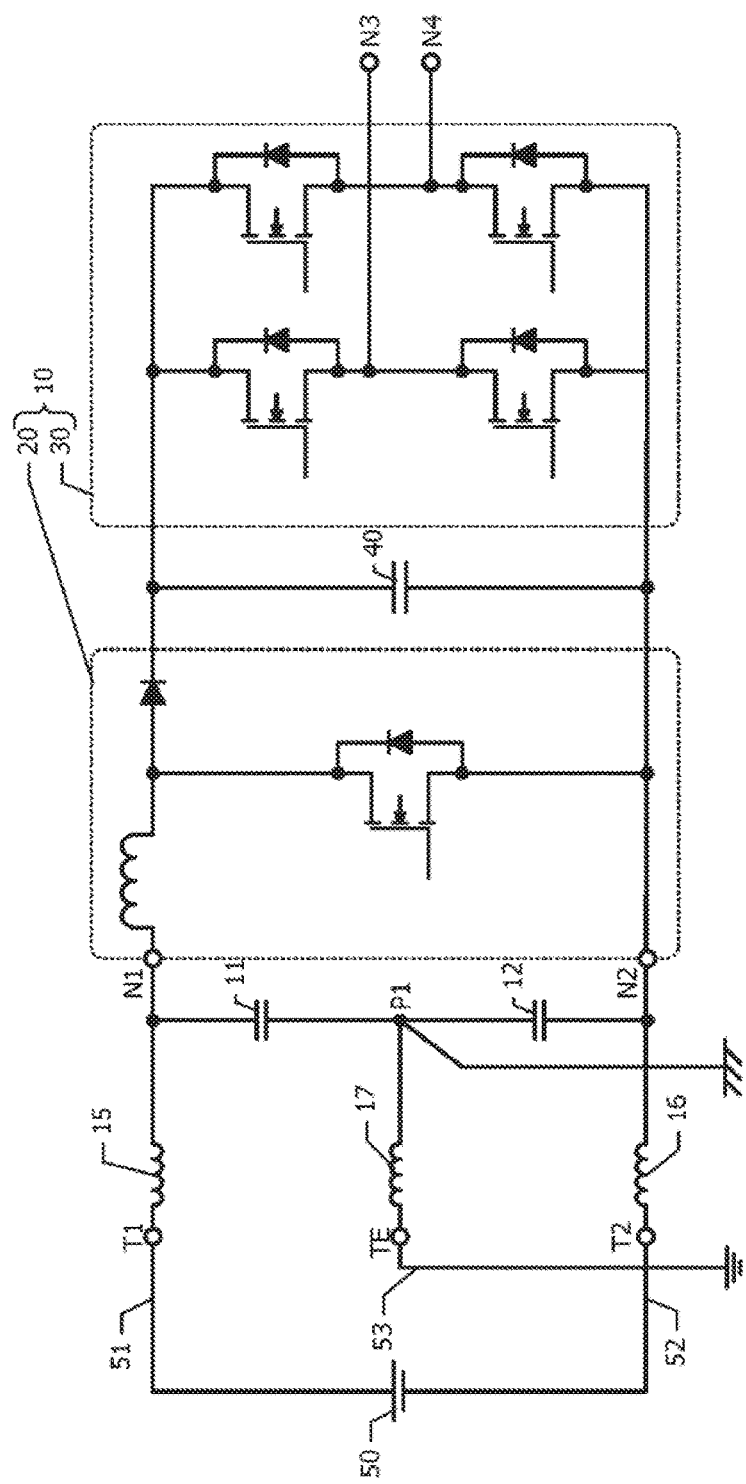
FIG. 4 is an equivalent circuit diagram of a power converter according to a second embodiment.

FIG. 4 shows an equivalent circuit diagram of the power converter according to the second embodiment. In the first embodiment, three-phase common mode choke coil 18 is constituted of inductors 15, 16, 17 (FIG. 1). In the second embodiment shown in FIG. 4, inductors 15, 16, 17 are constituted of individual coils and are not inductively coupled with one another. Electromagnetic properties of three inductors 15, 16, 17 are the same.

Figure 5A:
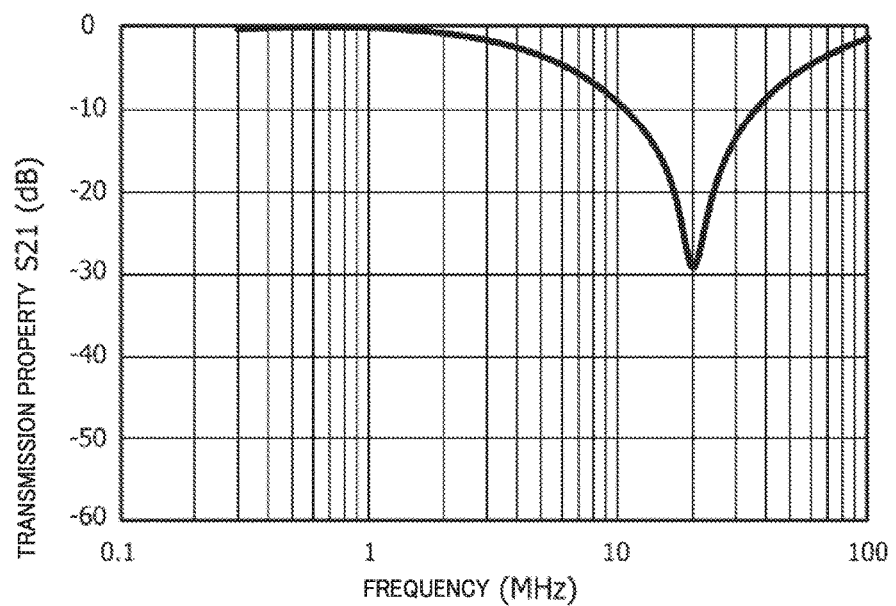
FIG. 5A is a graph showing a result of measurement of a transmission property S21 of an inductor used in the power converter according to the second embodiment.
Figure 5B:
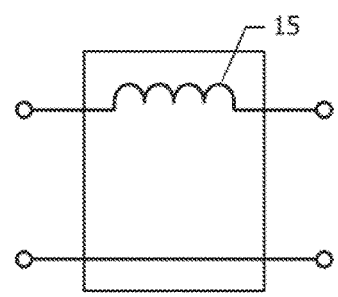
FIG. 5B is an equivalent circuit diagram of a two-terminal pair circuit when measuring the transmission property of the inductor.

With reference to FIG. 5A and FIG. 5B, electric properties of inductors 15, 16, 17 will be described. A two-terminal pair circuit shown in FIG. 5B was constructed using inductor 15, and a transmission property S21 was measured.

FIG. 5A shows a result of measurement of transmission property S21. The horizontal axis represents the frequency based on "MHz" as a unit and the vertical axis represents transmission property S21 based on "dB" as a unit. As S21 is smaller, insertion loss is larger. At a frequency of about 20 MHz, insertion loss exhibits the maximum value.

Figure 6A:
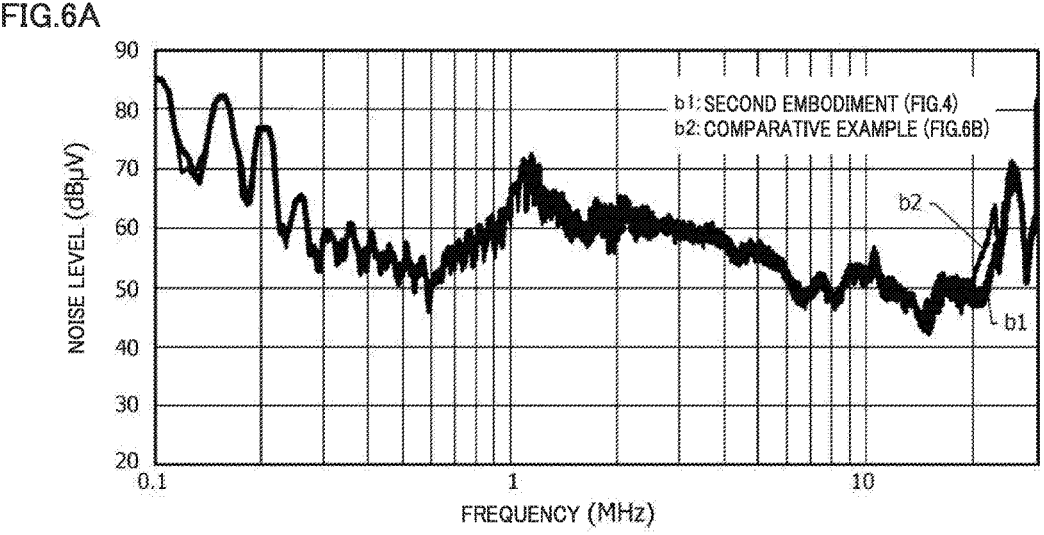
FIG. 6A is a graph showing a result of measurement of the noise level of the power converter according to each of the second embodiment and a comparative example.
Figure 6B:
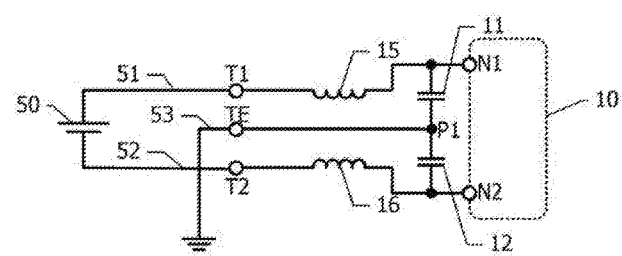
FIG. 6B is an equivalent circuit diagram of the power converter according to the comparative example.

Next, with reference to FIG. 6A and FIG. 6B, the following describes an excellent effect in the power converter according to the second embodiment. During the operation of each of the power converters according to the second embodiment and a comparative example, the level of noise leaking from external terminal T2 to negative line 52 was measured.

FIG. 6B shows an equivalent circuit diagram of the power converter according to the comparative example. In the power converter according to the comparative example, interconnection point P1 between Y capacitors 11, 12 is directly connected to earth terminal TE, not via an inductor. The other configurations are the same as those of the power converter (FIG. 4) according to the second embodiment.

FIG. 6A shows a result of measurement of the noise level in the power converter according to each of the second embodiment and the comparative example. The horizontal axis represents the frequency based on "MHz" as a unit and the vertical axis represents the noise level based on "dBμV" as a unit. A thick solid line b1 in FIG. 6A represents the level of noise leaking from external terminal T2 of the power converter according to the second embodiment into negative line 52, and a thin solid line b2 represents the level of noise leaking from external terminal T2 of the power converter according to the comparative example into negative line 52.

Around a frequency of 20 MHz, it is understood that the noise level of the power converter according to the second embodiment is lower than the noise level of the power converter according to the comparative example. The decrease of the noise level is attained by inserting inductor 17 into earth line 53. Inductor 17 exhibits the maximum value at 20 MHz.

As in the second embodiment, the noise level can be reduced by inserting inductor 17 in earth line 53 (FIG. 4). As compared with a case of using three-phase common mode choke coil 18 (FIG. 1) of the first embodiment, individual inductors with high versatility can be used, thereby achieving cost reduction. Further, a degree of freedom in layout positions of inductors 15, 16, 17 (FIG. 3) becomes high.

Also in the second embodiment, as with the first embodiment shown in FIG. 1, Y capacitors 11, 12 may not be provided. When Y capacitors 11, 12 are not provided, inductor 17 inserted between the ground conductor and earth terminal TE serves to suppress the noise generated in the ground conductor from leaking to earth line 53.

Third Embodiment

Figure 7:
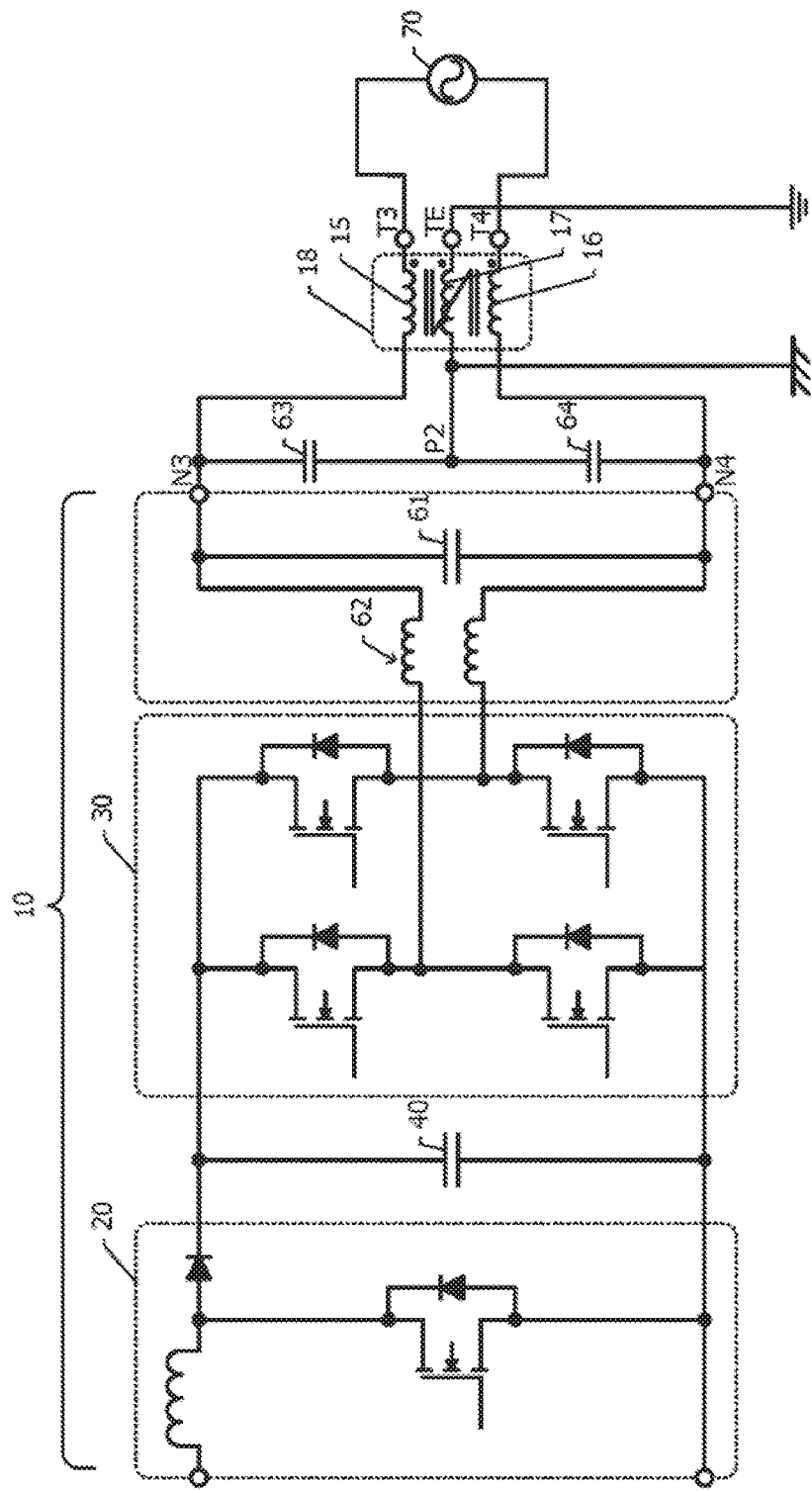
FIG. 7 is an equivalent circuit diagram of a power converter according to a third embodiment.

Next, the following describes a power converter according to a third embodiment with reference to FIG. 7. Hereinafter, a difference from the first embodiment will be described and common configurations will not be described. While three-phase common mode choke coil 18 is inserted at the input side of power conversion circuit 10 in the first embodiment, three-phase common mode choke coil 18 is provided at the output side of power conversion circuit 10 in the third embodiment. It should be noted that three-phase common mode choke coils 18 may be inserted both at the input side and the output side.

FIG. 7 shows an equivalent circuit diagram of the power converter according to the third embodiment. A power system 70 is connected to external terminals T3, T4 at the output side of the power converter. Earth terminal TE is grounded.

Two inductors 62 and a capacitor 61 are disposed between nodes N3, N4 at the output side of power conversion circuit 10 and the output node of inverter 30. Two inductors 62 are inserted in respective two output lines of inverter 30. Capacitor 61 connects the two output lines to each other. The capacitor for connecting two signal lines (power supply lines) to each other is commonly referred to as "X capacitor". X capacitor 61 reduces differential mode noise.

Inductor 15 is inserted between node N3 and external terminal T3, and inductor 16 is inserted between node N4 and external terminal T4. One electrode (first electrode) of a Y capacitor 63 is connected to node N3, and one electrode (first electrode) of a Y capacitor 64 is connected to node N4. The other electrode (second electrode) of Y capacitor 63 is connected to the other electrode (second electrode) of Y capacitor 64. Inductor 17 is connected between earth terminal TE and interconnection point P2 between Y capacitor 63 and Y capacitor 64. Three-phase common mode choke coil 18 is constituted of inductors 15, 16, 17. Furthermore, interconnection point P2 is connected to the ground conductor.

Also in the third embodiment, by inserting three-phase common mode choke coil 18, the level of the common mode noise leaking from external terminals T3, T4 into power system 70 can be reduced. It should be noted that as with the first embodiment shown in FIG. 1, Y capacitors 63, 64 may not be provided.

Fourth Embodiment

Figure 8:
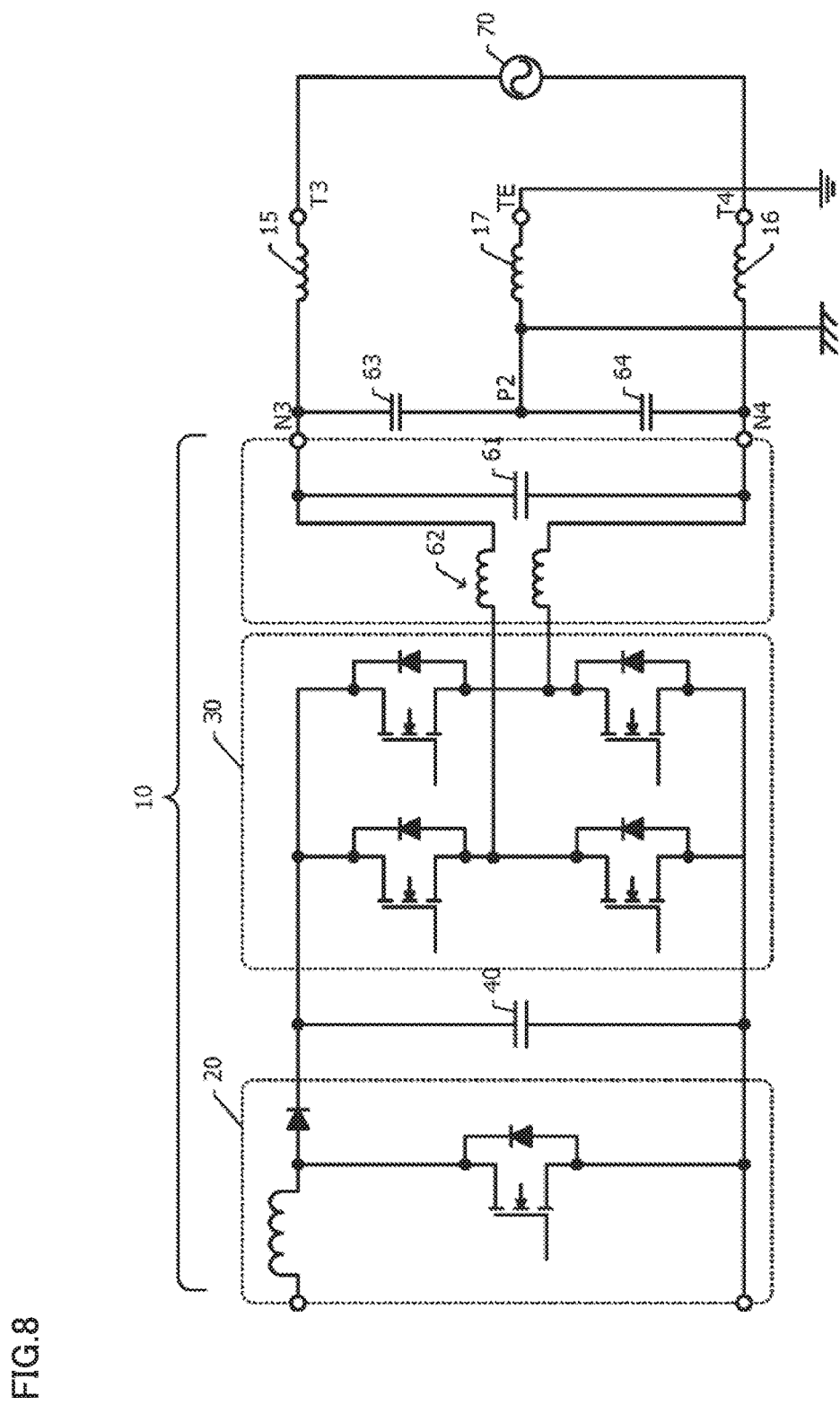
FIG. 8 is an equivalent circuit diagram of a power converter according to a fourth embodiment.

Next, with reference to FIG. 8, the following describes a power converter according to a fourth embodiment. Hereinafter, a difference from the third embodiment (FIG. 7) will be described and common configurations will not be described.

FIG. 8 shows an equivalent circuit diagram of the power converter according to the fourth embodiment. While three-phase common mode choke coil 18 is constituted of inductors 15, 16, 17 (FIG. 7) in the third embodiment, the three inductors, i.e., inductors 15, 16, 17 are independent from one another in the fourth embodiment.

In the fourth embodiment, as with the power converter according to the second embodiment shown in FIG. 4, common mode noise can be suppressed from leaking from external terminals T3, T4 to power system 70. It should be noted that as with the third embodiment shown in FIG. 7, Y capacitors 63, 64 may not be provided.

Fifth Embodiment

Figure 9:
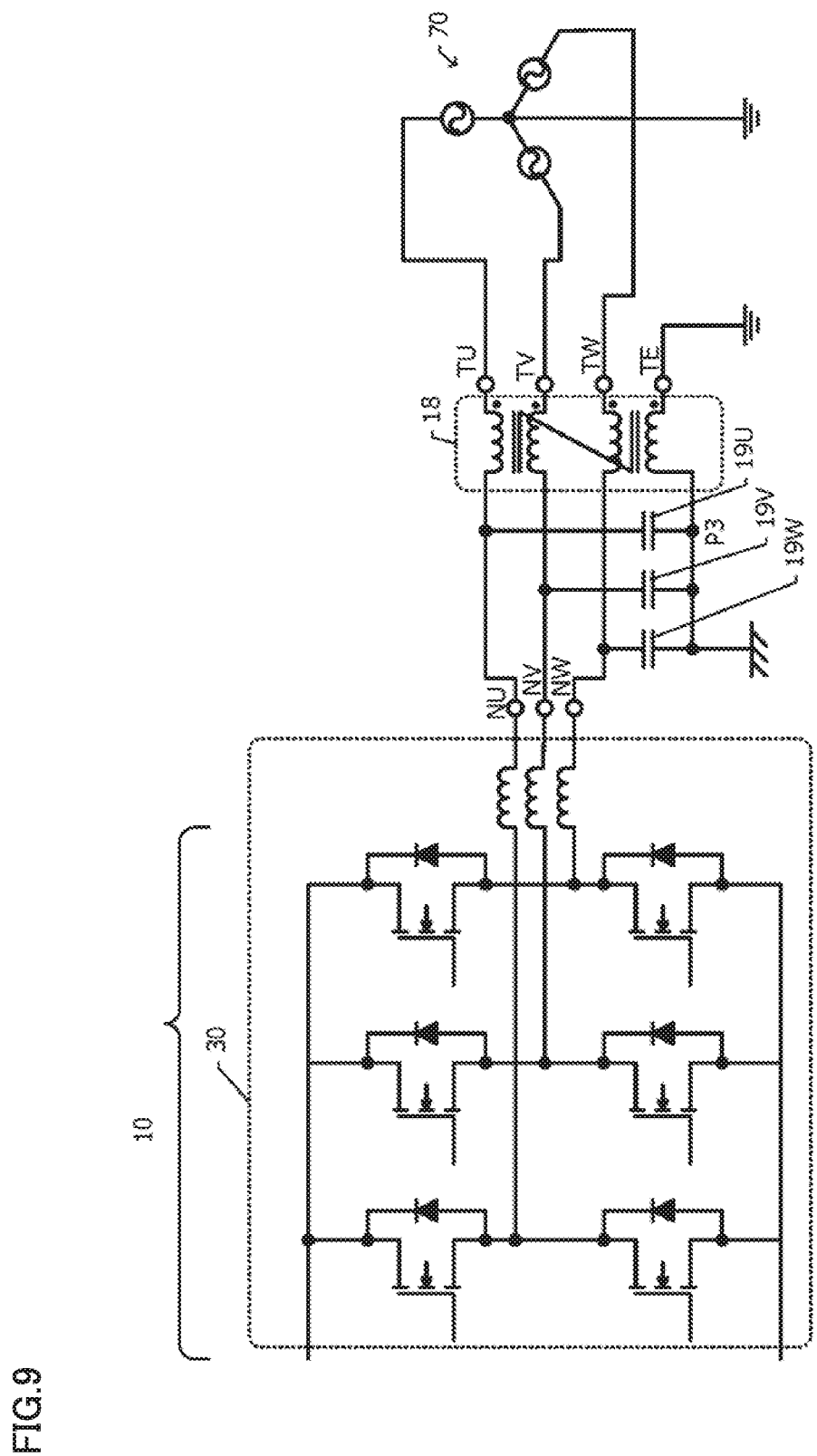
FIG. 9 is an equivalent circuit diagram of a power converter according to a fifth embodiment.

Next, the following describes a power converter according to a fifth embodiment with reference to FIG. 9. Hereinafter, a difference from the third embodiment (FIG. 7) will be described and common configurations will not be described.

FIG. 9 shows an equivalent circuit diagram of the power converter according to the fifth embodiment. While the power converter is connected to single-phase power system 70 in the third embodiment, the power converter is connected to a three-phase power system 70 in the fifth embodiment.

Although inverter 30 (FIG. 7) of the third embodiment has two switching element pairs, inverter 30 includes three switching element pairs for U, V, and W phases, and three nodes NU, NV, NW at the output side in the fifth embodiment. Correspondingly, inverter 30 includes external terminals TU, TV, TW for U, V, and W phases and earth terminal TE. Electrodes (first electrodes) of Y capacitors 19U, 19V, 19W are connected to nodes NU, NV, NW. The other electrodes (second electrodes) of Y capacitors 19U, 19V, 19W are connected to one another.

A four-phase common mode choke coil 18 is inserted in three power supply lines and an earth line. The three power supply lines connect nodes NU, NV, NW to external terminals TU, TV, TW, respectively. The earth line connects an interconnection point P3 between the second electrodes of Y capacitors 19U, 19V, 19W to earth terminal TE. Interconnection point P3 is connected to the ground conductor.

Also in the fifth embodiment, as with the third embodiment shown in FIG. 7, the level of the common mode noise leaking from external terminals TU, TV, TW into power system 70 can be reduced. It should be noted that as with the third embodiment shown in FIG. 7, Y capacitors 19U, 19V, 19W may not be provided.

Each of the above-described embodiments is exemplary and portions of configurations in different embodiments can be replaced or combined. The same function and effect provided by the same configuration among a plurality of embodiments are not described for each of the embodiments. Moreover, the present disclosure is not limited to the embodiments described above. For example, it is obvious for one having ordinary skill in the art to make various modifications, improvements, combinations, and the like.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A power converter comprising:
a plurality of external terminals;
an earth terminal connected to a ground;
a power conversion circuit including a plurality of nodes, each of the plurality of nodes being connected to a corresponding one of the plurality of external terminals, the power conversion circuit being configured to perform power conversion by switching received power;
a ground conductor;
a plurality of inductors, each of the plurality of inductors being inserted between a corresponding one of the plurality of external terminals and a corresponding one of the plurality of nodes; and another inductor inserted between the ground conductor and the earth terminal.

2. The power converter according to claim 1, further comprising a plurality of capacitors each including a first electrode and a second electrode, the first electrode being connected to a corresponding one of the plurality of nodes, the second electrode being connected to the ground conductor.

3. The power converter according to claim 1, wherein the plurality of inductors each inserted between the corresponding one of the plurality of external terminals and the corresponding one of the plurality of nodes are inductively coupled with the other inductor inserted between the ground conductor and the earth terminal to construct a common mode choke coil having not less than three phases.

4. The power converter according to claim 1, wherein
the plurality of external terminals are connected to a DC power supply, and
the power conversion circuit is configured to:
receive DC power from the plurality of nodes;
convert the DC power into AC power; and
output the AC power.

5. The power converter according to claim 1, wherein
the plurality of external terminals are connected to a power system, and
the power conversion circuit is configured to:
receive DC power;
convert the DC power into AC power; and
output the converted AC power from the plurality of nodes to the power system.

* * * * *